(12) United States Patent
Bastholm

(10) Patent No.: US 10,879,818 B2
(45) Date of Patent: Dec. 29, 2020

(54) LINEAR ACTUATOR WITH A BRUSHLESS DC MOTOR

(71) Applicant: Linak A/S, Nordborg (DK)

(72) Inventor: Jeppe Christian Bastholm, Sønderborg (DK)

(73) Assignee: LINAK A/S, Nordborg (DK)

( * ) Notice: Subject to any disclaimer, the term of this patent is extended or adjusted under 35 U.S.C. 154(b) by 0 days.

(21) Appl. No.: 15/775,968

(22) PCT Filed: Nov. 15, 2016

(86) PCT No.: PCT/DK2016/000043
§ 371 (c)(1),
(2) Date: May 14, 2018

(87) PCT Pub. No.: WO2017/084668
PCT Pub. Date: May 26, 2017

(65) Prior Publication Data
US 2018/0331638 A1 Nov. 15, 2018

(30) Foreign Application Priority Data
Nov. 16, 2015 (DK) .................. 2015 00727

(51) Int. Cl.
*H02P 6/08* (2016.01)
*H02K 7/06* (2006.01)
(Continued)

(52) U.S. Cl.
CPC ............. *H02P 6/08* (2013.01); *H02K 7/06* (2013.01); *H02P 6/00* (2013.01); *H02P 6/17* (2016.02);
(Continued)

(58) Field of Classification Search
USPC ........................................... 318/115
See application file for complete search history.

(56) References Cited

U.S. PATENT DOCUMENTS

| 9,093,930 | B2 | 7/2015 | Koch et al. |
| 2008/0030155 | A1* | 2/2008 | Patel ............... B60K 6/26 |
| | | | 318/400.02 |

(Continued)

FOREIGN PATENT DOCUMENTS

| EP | 0662573 B1 | 4/1998 |
| JP | 2010252480 A | * 11/2010 |

OTHER PUBLICATIONS

[Adriano De Rosa: "How to cost-effectively transition to Brushless DC Motors for Your Applications", Nov. 10, 2015 (Nov. 10, 2015), XP055357994] (Year: 2015).*

(Continued)

*Primary Examiner* — Jorge L Carrasquillo
(74) *Attorney, Agent, or Firm* — Dykema Gossett PLLC

(57) ABSTRACT

A linear actuator comprises a brushless DC motor (31), a driver circuit (51) for providing a multiphase voltage signal to the motor (31) and a controller (58) for detecting a rotor position and providing control signals to the driver circuit (51) in dependence thereof. Detector circuitry (61) detects a signal indicative of rotor speed. The controller (58) is configured to control the driver circuit (51) to drive the motor with a first waveform of the multiphase voltage signal, when the indicative signal indicates that the rotor speed does not exceed a predetermined speed; and control the driver circuit (51) to drive the motor with a second waveform of the multiphase voltage signal, when the indicative signal indicates that the rotor speed exceeds the predetermined speed, wherein the second waveform is selected to drive the motor (31) with an efficiency less than the efficiency when driven by the first waveform.

11 Claims, 11 Drawing Sheets

(51) Int. Cl.
*H02P 6/17* (2016.01)
*H02P 6/00* (2016.01)
*F16H 25/20* (2006.01)

(52) U.S. Cl.
CPC .......... *F16H 25/20* (2013.01); *H02P 2205/07* (2013.01); *H02P 2207/05* (2013.01)

(56) References Cited

U.S. PATENT DOCUMENTS

| | | | | |
|---|---|---|---|---|
| 2009/0072778 | A1* | 3/2009 | Schulz | H02P 6/08 318/721 |
| 2015/0007756 | A1* | 1/2015 | Kollreider | A47B 9/04 108/21 |

OTHER PUBLICATIONS

Adriano De Rosa: "How to cost-effectively transition to Brushless DC Motors for Your Applications", Nov. 10, 2015, XP055357994, (16 pgs.) https://www.micronas.com/de/system/files/downloads/files/BLDC%20Motor%20control%20with%20the%20Micronas%20HVC%204223F%20Single-chip%20Solution.pdf Retrieved from the Internet: URL: https://www.linkedin.com/pulse/how-cost-effectively-transition-brushless-dc-motors-mark-shapiro?forceNoSplash=true.

* cited by examiner

LINEAR ACTUATOR WITH A BRUSHLESS DC MOTOR

CROSS-REFERENCE TO RELATED APPLICATIONS

This application is a national stage filing based upon international application no. PCT/DK2016/000043, filed 15 Nov. 2016 (the '043 application), and published in English on 26 May 2017 under international publication no. WO 2017/084668 A1, which claims priority to Denmark (DK) patent application no. PA 2015 00727, filed 16 Nov. 2015 (the '727 application). The '043 application and the '727 application are both hereby incorporated by reference as though fully set forth herein.

TECHNICAL FIELD

The invention relates to a linear actuator comprising a brushless DC motor, a driver circuit and a controller, to an actuator system comprising at least one linear actuator and to a method of controlling a linear actuator comprising a brushless DC motor, a driver circuit and a controller. The invention also relates to a computer program and a computer readable medium.

BACKGROUND

Linear actuators are devices for transforming a rotational movement of typically an electric motor to a linear movement of a mechanical equipment, and a linear actuator normally comprises a reversible electric motor, a transmission or reduction gear, typically with several stages, a spindle, a spindle nut and an activation element. When the spindle is rotated by the motor, the spindle nut moves along the spindle, thus transforming the rotation to a linear movement of the activation element.

Different motor types can be used as the reversible electric motor in a linear actuator. Traditionally, a standard DC motor of the brushed type has been the most commonly used motor type because of its simple design and low cost, and because its speed can be controlled directly by a DC voltage or a pulse width modulated voltage. However, also linear actuators using a brushless DC motor are known. An example is described in U.S. Pat. No. 9,093,930 to Logic-Data. Due to the lack of the mechanical brushes and a different design, brushless DC motors have a higher efficiency, a higher reliability and a reduced electromagnetic interference. On the other hand, they have a higher cost, and they need a more complex control circuit.

Linear actuator systems are used in many different applications, such as trucks, agricultural machinery, industrial automation equipment, hospital and care beds, leisure beds and chairs, tables or other articles of furniture with adjustable height and several other similar applications. In many of these applications, a load is to be moved in a vertical direction, and the linear actuator can be subject to both push and pull loads, which can be both dynamic and static. Especially with heavy loads, considerable more energy is required to lift the load up than to lower it down. In other words, the electric motor must provide a higher torque when a load is moved upwards than when the same load is moved downwards. If the spindle of the actuator is not self-locking, a braking effect is needed to prevent the spindle, and thus the load, from accelerating to a speed higher than the intended speed, when the load is moved downwards.

Whether the spindle of a linear actuator is self-locking or non-self-locking depends on the thread pitch of the spindle. If the thread pitch is less than the angle of friction, the spindle is self-locking, and if the thread pitch is greater than the angle of friction, the spindle is non-self-locking. It is here noted that the angle of friction depends on different factors such as material, the working of the material, lubrication, temperature and dynamic conditions such as vibrations. Further, there is a difference between the static and the dynamic friction, where the static friction is larger than the dynamic friction.

In linear actuators, non-self-locking spindles are most often preferred over self-locking spindles. One of the reasons is that the non-self-locking spindles can be operated with higher efficiency than self-locking spindles, i.e. they are less energy intensive to drive. Another reason is that the non-self-locking spindles, due to the larger thread pitch, can operate at higher speed and thus perform an adjustment quicker than the self-locking spindles. However, as mentioned above, linear actuators using non-self-locking spindles must be equipped with braking means to ensure that the adjustment speed is not exceeded and also that a given position can be kept. As to the adjustment speed, it is noted that the use of non-self-locking spindles carries a potential risk of uncontrolled rotation, if for example the braking means should fail. In that case, the load on the activation element (i.e. on the spindle nut) will cause the spindle to start rotating, so that the activation element will move at increasing speed towards the lower end of the spindle. Here, the mechanical braking means should ensure that damages of the linear actuator and/or the device in which the linear actuator is used are avoided.

Different types of mechanical braking means for use in linear actuators are known.

One known type of brake comprises two cylindrical elements interconnected with a cylindrical spring. Between the two cylindrical elements a needle bearing is arranged, and between the free end of one of the two cylindrical elements and a fixed part, there is a friction disc. In one direction of rotation of the spindle, i.e. when the load is moved upwards, the two cylindrical elements are mutually disengaged and the spindle can rotate freely. In the other direction of rotation, i.e. when the load is moved downwards, the two cylindrical elements are interconnected, so that the friction disc is activated for braking of the spindle. This brake construction is for that matter fine, but it consists of relatively many parts, is relatively expensive and takes up a lot of space.

Another and simpler brake simply comprises a cylindrical spring arranged around a cylindrical element on the end of the spindle or a gearwheel in the transmission. In one direction of rotation of the spindle, i.e. when the load is moved upwards, the spring loosens itself from the cylindrical element and the spindle can rotate freely. This is owing to the fact that the spring with its angular direction is arranged such that it is affected to attempt to wind itself off the cylindrical element, by which the diameter of the spring is increased. In the other direction of rotation of the spindle, i.e. when the load is moved downwards, the spring tightens itself around the cylindrical element and exerts a braking force, thus keeping the spindle steady when the power for the motor is cut off. The braking force is adjusted to be overcome by the motor when the activation element is reversed towards the initial position. The brake is thus active when the activation element is reversed towards the initial position, i.e. the brake dampens the return speed of the activation element. In this brake, the spring functions as an actual brake, i.e. the spring itself exerts the braking force. This brake is described in EP 0 662 573 B1 to LINAK A/S. This brake is effective and relatively inexpensive.

However, brakes of a mechanical type require additional mechanical components, which is an additional cost and which also results in increased space requirements for the linear actuator system. The additional mechanical components are also subject to additional mechanical wear, which in combination with the fact that the friction between the braking components among other things depends on lubrication and temperature often results in a braking force that varies over time.

SUMMARY

Therefore, it is an object of embodiments of the invention to provide a linear actuator, which without the use of mechanical brakes can provide the necessary braking effect, e.g. in situations where a heavy load causes a non-self-locking spindle to accelerate to a speed higher than the intended speed, when the load is moved downwards. In this way, the drawbacks of mechanical brakes can be reduced or avoided.

According to embodiments of the invention the object is achieved in a linear actuator comprising a brushless DC motor comprising a number of stator coils and a permanent magnet rotor; a driver circuit configured to provide a multiphase voltage signal to the stator coils of said brushless DC motor; and a controller for detecting a position of said permanent magnet rotor and providing control signals to said driver circuit in dependence of said rotor position. The object is achieved when the linear actuator further comprises detector circuitry for detecting a signal indicative of a rotation speed of said permanent magnet rotor, and that the controller is further configured to control the driver circuit to drive the stator coils of the motor with a first waveform of said multiphase voltage signal, when said indicative signal indicates that the rotation speed of said permanent magnet rotor does not exceed a predetermined speed; and control the driver circuit to drive the stator coils of the motor with a second waveform of said multiphase voltage signal, when said indicative signal indicates that the rotation speed of said permanent magnet rotor exceeds said predetermined speed, wherein said second waveform is selected to drive the motor with an efficiency that is less than the efficiency of the motor when driven by said first waveform.

When a brushless DC motor is driven with a first waveform, when no braking effect is needed, and driven with another waveform resulting in a lower efficiency of the motor, when an increased speed is detected, energy is dissipated in the motor with the result that the desired braking effect can be achieved.

In some embodiments, said brushless DC motor is of a type having a trapezoidal back electromotive force, and the controller and the driver circuit are configured to provide said first waveform of said multiphase voltage signal by commutating phase currents between stator coils at times determined in dependence of said rotor position, so that the multiphase voltage signal has a frequency corresponding to the rotation speed of said permanent magnet rotor.

In other embodiments, said brushless DC motor is of a type having a sinusoidal back electromotive force, and the controller and the driver circuit are configured to provide said first waveform of said multiphase voltage signal in dependence of said rotor position as a multiphase sinusoidal voltage signal having a frequency corresponding to the rotation speed of said permanent magnet rotor.

In an embodiment of the linear actuator, the controller and the driver circuit are further configured to provide said second waveform by commutating at least one phase current at a time that is different from the time determined in dependence of said rotor position. When a commutation from one phase to another is delayed or advanced in time or angle position, the torque delivered by the motor, and thus also its efficiency, is reduced with the result that a braking effect is achieved.

In another embodiment of the linear actuator, the controller and the driver circuit are further configured to provide said second waveform by changing for a predetermined period of time the frequency of the multiphase voltage signal to a frequency that is different from the frequency corresponding to the rotation speed of said permanent magnet rotor. When the frequency of the multiphase voltage signal is changed, the rotating magnetic field created by the stator coils of the brushless DC motor will be out of synchronism with the rotation of the rotor. This reduces the torque production and the efficiency of the motor, and a braking effect is achieved.

In a further embodiment of the linear actuator, the controller and the driver circuit are further configured to provide said second waveform by superimposing on the multiphase voltage signal a signal having a frequency higher than the frequency corresponding to the rotation speed of said permanent magnet rotor.

In this embodiment, the controller and the driver circuit may further be configured to superimpose said higher frequency signal for a predetermined period of time or for a period of time determined in dependence of said signal indicative of the rotation speed of said permanent magnet rotor. Alternatively, the controller and the driver circuit may further be configured to superimpose said higher frequency signal with an amplitude determined in dependence of said signal indicative of the rotation speed of said permanent magnet rotor.

An actuator system may comprise at least one linear actuator as described above. In this way, the actuator system benefits from the described advantages of the linear actuator.

As mentioned, the invention further relates to a method of controlling a linear actuator, the linear actuator comprising a brushless DC motor comprising a number of stator coils and a permanent magnet rotor; a driver circuit; and a controller, the method comprising the steps of providing a multiphase voltage signal from the driver circuit to the stator coils of said brushless DC motor; detecting a position of said permanent magnet rotor and providing control signals to said driver circuit in dependence of said rotor position; detecting a signal indicative of a rotation speed of said permanent magnet rotor, controlling the driver circuit to drive the stator coils of the motor with a first waveform of said multiphase voltage signal, when said indicative signal indicates that the rotation speed of said permanent magnet rotor does not exceed a predetermined speed; and controlling the driver circuit to drive the stator coils of the motor with a second waveform of said multiphase voltage signal, when said indicative signal indicates that the rotation speed of said permanent magnet rotor exceeds said predetermined speed, wherein said second waveform is selected to drive the motor with an efficiency that is less than the efficiency of the motor when driven by said first waveform.

When a brushless DC motor is driven with a first waveform, when no braking effect is needed, and driven with another waveform resulting in a lower efficiency of the motor, when an increased speed is detected, energy is dissipated in the motor with the result that the desired braking effect can be achieved.

The invention also relates to a computer program comprising program code means for performing the steps of the method described above when said computer program is run on a computer, and to a computer readable medium having stored thereon program code means for performing the method described above when said program code means is run on a computer.

BRIEF DESCRIPTION OF THE DRAWINGS

Embodiments of the invention will now be described more fully below with reference to the drawings, in which.

DETAILED DESCRIPTION

Figure 1A:
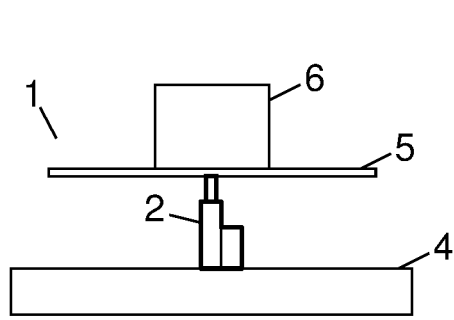
FIGS. 1a and 1b show a mechanical equipment using an actuator system, FIG. 2 schematically shows an example of a linear actuator.
Figure 1B:
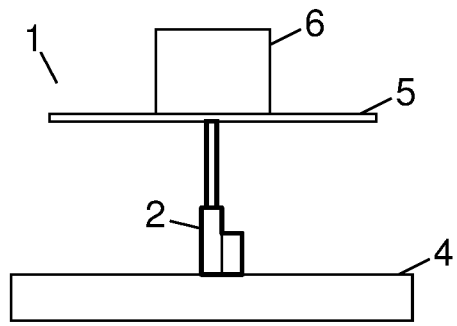

FIGS. 1a and 1b illustrate a mechanical equipment 1 using an actuator system in which the invention can be utilized. The equipment 1 can represent any one of several different applications, such as trucks, agricultural machinery, industrial automation equipment, hospital and care beds, leisure beds and chairs, tables or other articles of furniture with adjustable height and several other similar applications. The equipment 1 comprises a linear actuator 2 arranged between a base 4 and a carrying element 5 on which a load 6 is shown. Alternatively, the equipment 1 may also comprise two or more linear actuators. Although such actuators may also be used for moving a load or an element in a horizontal direction, this description relates to applications where a load is to be moved in a vertical direction, or at least in a non-horizontal direction. In these situations, the linear actuator can be subject to both push and pull loads, which can be both dynamic and static. It is noted that to move the load in a vertical direction, the linear actuator does not need to be arranged vertically as shown in FIGS. 1a and 1b. By using linkages, a vertical movement of the load can be obtained from linear actuators arranged in other positions, e.g. horizontally.

In FIG. 1a, the carrying element 5 and the load 6 is shown in a lower position, while in FIG. 1b the carrying element 5 and the load 6 has been lifted to an elevated position by the linear actuator 2.

Figure 2:
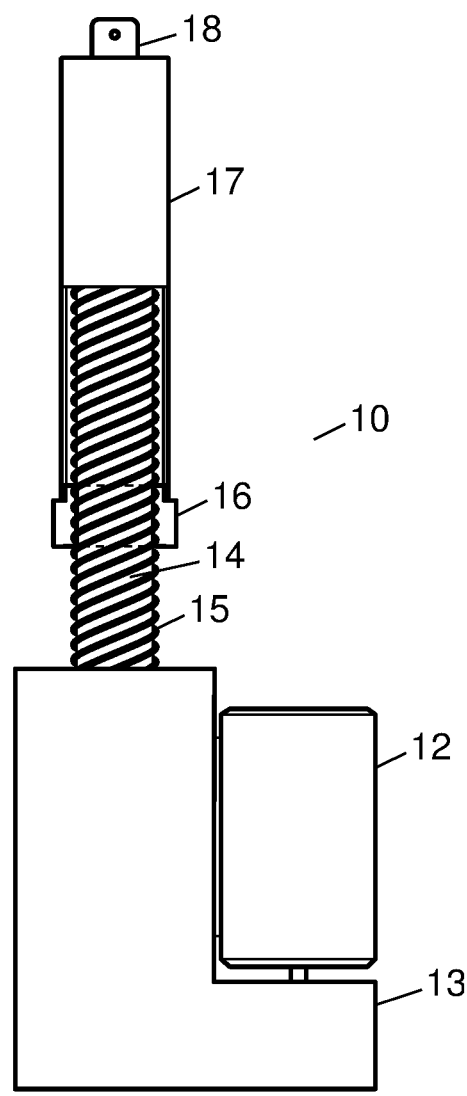

FIG. 2 schematically shows an example of a linear actuator 10 corresponding to the linear actuator 2 shown in FIGS. 1a and 1b. The linear actuator 10 comprises a reversible electric motor 12, a transmission or reduction gear 13, typically with several stages, a spindle 14 having a thread 15, a spindle nut 16 engaging the thread 15 and a tube-shaped activation element 17. At the end of the activation element 17, a mounting bracket 18 for mounting the linear actuator 10 to e.g. a carrying element is placed. When the spindle 14 is rotated by the motor 12, the spindle nut 16 moves along the spindle 14, thus transforming the rotation to a linear movement of the activation element 17. It is noted that with some motor types, the reversible electric motor 12 can drive the spindle 14 directly, so that the transmission 13 can be avoided.

Especially with heavy loads, considerable more energy is required to lift the load up than to lower it down. In other words, the electric motor 12 must provide a higher torque when a load is moved upwards than when the same load is moved downwards. The motor supplies energy to the system when the load is moved upwards, and this energy must be released again when the load is moved downwards. If the spindle is not self-locking, a braking effect is needed to prevent the spindle 14, and thus the load, from accelerating to a speed higher than the intended speed, when the load is moved downwards.

Whether the spindle of the linear actuator 10 is self-locking or non-self-locking depends on the thread pitch of the spindle 14. If the thread pitch is less than the angle of friction, the spindle is self-locking, and if the thread pitch is greater than angle of friction, the spindle is non-self-locking.

Figure 3:
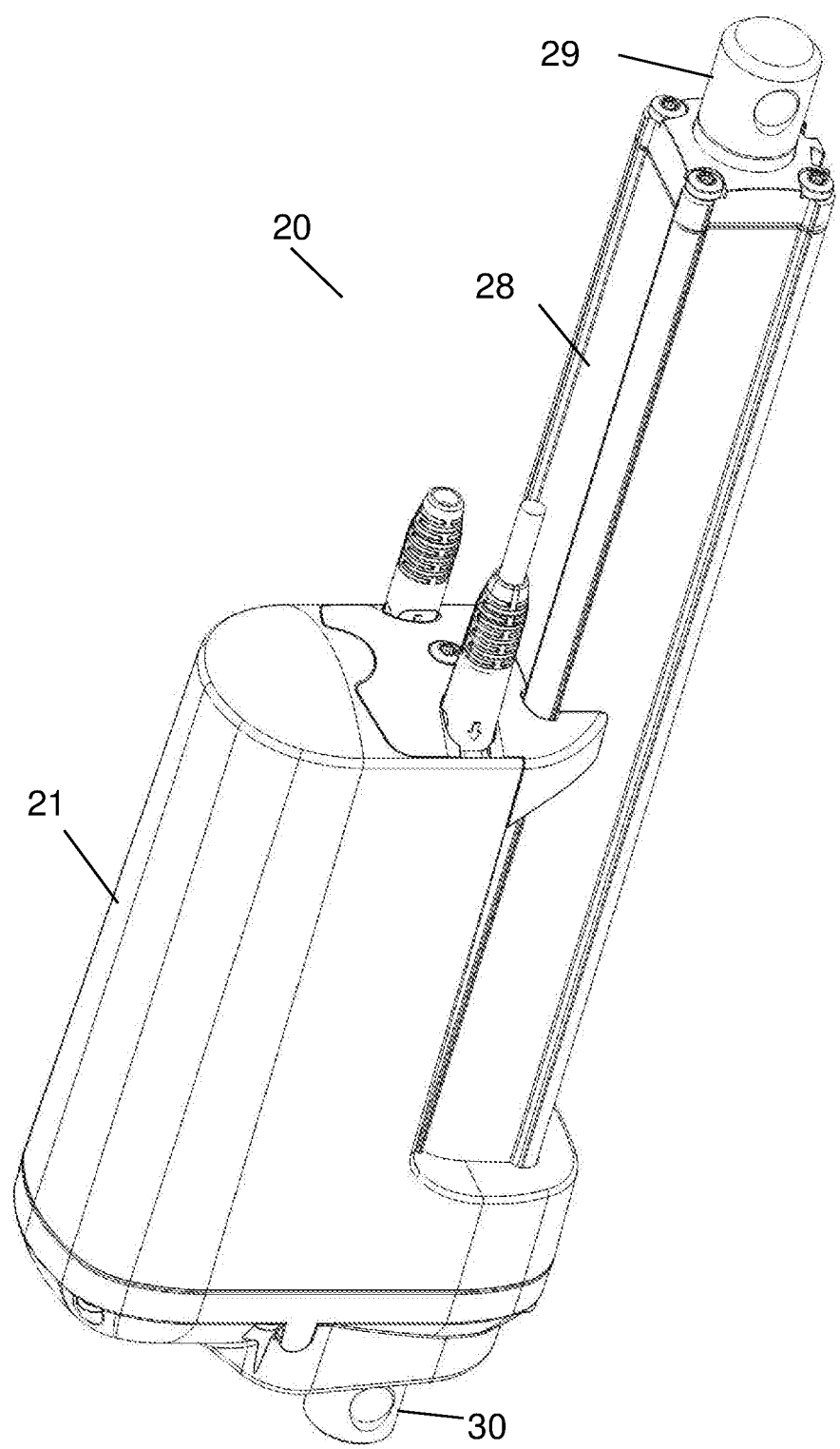
FIG. 3 shows another example of a linear actuator seen in perspective from the front.
Figure 4:
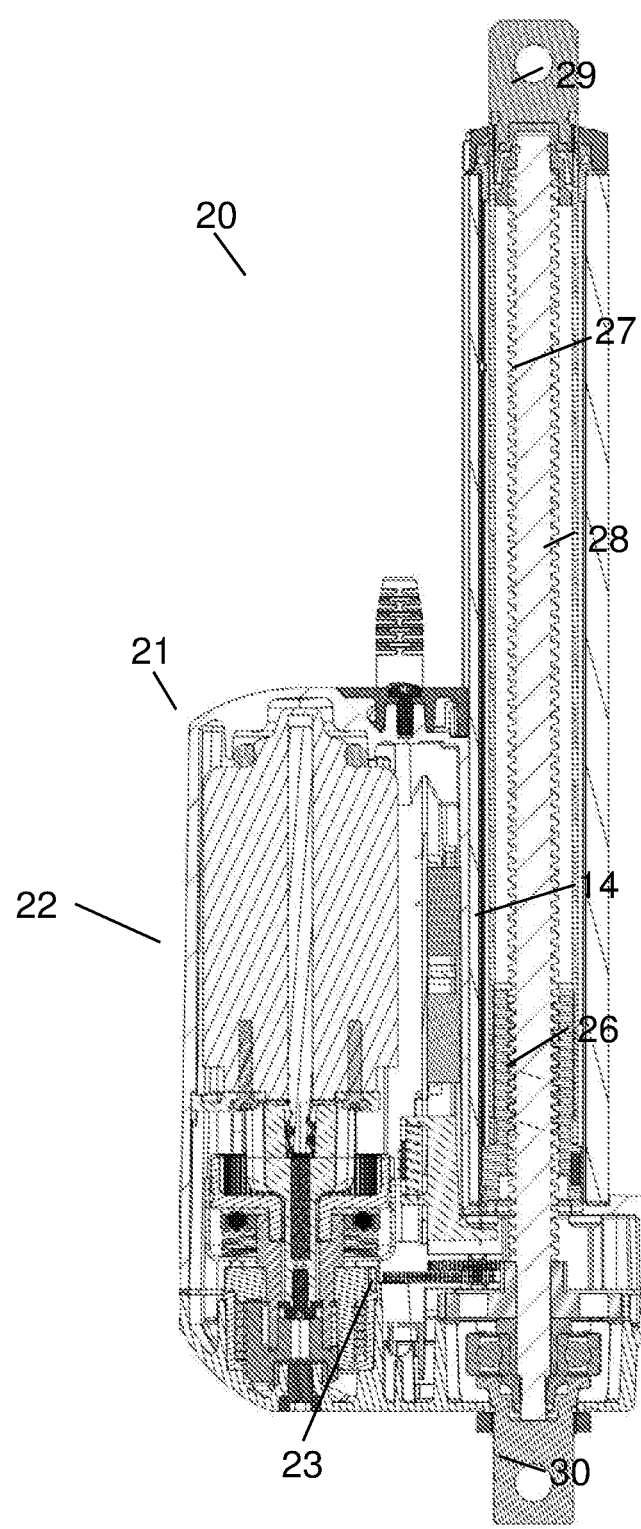
FIG. 4 shows a longitudinal section through the actuator of FIG. 3.

FIGS. 3 and 4 show another example of a linear actuator 20 in more detail. The main components of the actuator 20 are a cabinet 21, a reversible electric motor 22, a reduction gear 23 with several stages, a spindle 24, a spindle nut 26, an activation element 27 in the form of a tubular piston, also called the inner pipe, a guide 28 therefor, also called the outer pipe, a mounting bracket 29 and finally a rear mount 30.

Until now, the most commonly used motor type in linear actuators is a traditional DC motor of the brushed type. This motor type has a simple design and a low cost, and its speed can be controlled directly by a DC voltage or a pulse width modulated voltage. However, in some cases, so-called brushless DC motors have been used in linear actuators. Brushless DC motors have a higher efficiency, a higher reliability and a reduced electromagnetic interference. On the other hand, they have a higher cost, and they need a more complex control circuit.

The normal brushed DC motor uses a stator with permanent magnets arranged around a rotor with electromagnets wound on a rotating core. Brushes of e.g. graphite or other materials are used to switch or commutate the voltage to the coils during rotation of the rotor so that its motion is maintained.

In a brushless DC motor, this principle is turned inside out by arranging permanent magnets on the rotor and windings on the stator. This eliminates problems associated with connecting current to the moving armature. An electronic control circuit, which replaces the brushes or commutator assembly of the brushed DC motor, continually switches the phases to the windings to keep the motor turning. The controller performs timed power distribution similar to that of a brushed DC motor by using a solid-state circuit rather than the brushes or commutator system.

Actually, a brushless DC electric motor is an AC synchronous motor that is powered from a DC electric source by a control circuit providing an AC electric signal to drive the motor. The AC electric signal does not necessarily have a sinusoidal waveform. It just refers to a bi-directional current without any restrictions on its waveform.

The permanent magnets on the rotor create the rotor flux and the energized stator windings create electromagnet poles. The rotor, which can be considered as being equivalent to one or more bar magnets, is attracted by the energized stator phase. By using the appropriate sequence to supply the stator phases, a rotating field on the stator is created and maintained. This action of the rotor, chasing after the electromagnet poles on the stator, is the fundamental action used in synchronous permanent magnet motors.

The lead between the rotor and the rotating field must be controlled to produce torque and this synchronization implies knowledge of the rotor position. In other words, the controller needs some means of determining the rotor's orientation and position relative to the stator coils. Some designs use Hall Effect sensors or a rotary encoder to measure the rotor's position directly. Others measure the back electromotive force (EMF) in undriven coils to infer the rotor position, thereby eliminating the need for separate Hall Effect sensors, and such controllers are therefore often called sensorless controllers.

AC synchronous motors with permanent magnets can be classified by their back-EMF profiles, i.e. the shape of the back EMF. Here it is noted that when manually spinning the rotor of a brushless DC motor it becomes a generator, and the generated voltage is the back EMF. Here, two motor types can be mentioned, which are both synchronous motors having permanent magnets on the rotor, but differ in the flux distributions and back-EMF profiles. The difference between them is the shape of the induced voltage, resulting from two different manners of wiring the stator coils. One type has a trapezoidal back EMF, while the other has a sinusoidal back EMF. Sometimes the term brushless DC (BLDC) motor is used about the motor having a trapezoidal back EMF, while the one having a sinusoidal back EMF is called a permanent magnet synchronous motor (PMSM). Here, both types will be considered as brushless DC motors. Motors with trapezoidal back EMF and rectangular stator currents are widely used because the mechanical torque developed by the motor is constant, when the motor has pure trapezoidal back EMF and the commutation process for the stator phases is accurate.

The efficiency of a brushless DC motor is highest when the drive voltage matches the back EMF voltage from the motor. This means that with a motor having a trapezoidal back EMF, the best efficiency is obtained by using a corresponding trapezoidal drive voltage, and correspondingly, the best efficiency for a motor having a sinusoidal back EMF is obtained by using a sinusoidal drive voltage.

Below, an example of the electronic commutation process will be described in further detail using a three phase synchronous motor with a one permanent magnet pair pole rotor as an example. It is noted that on the stator side, three phase motors are the most common, because they offer a good compromise between precise control and the number of power electronic devices required to control the stator currents. However, on the rotor side, a greater number of poles are often used because they usually create a greater torque for the same level of current. Also motors using more than three phases are used.

Figure 5:
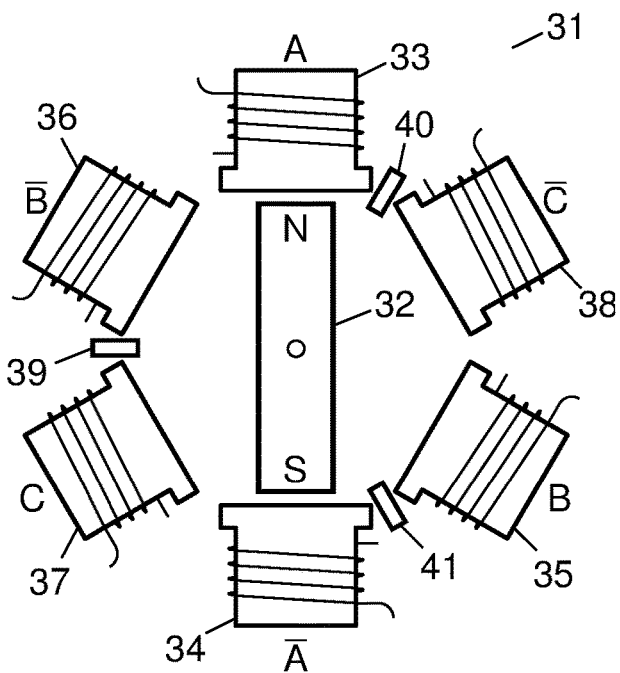
FIG. 5 shows a schematic structure of an example of a three phase brushless DC motor.

FIG. 5 illustrates a schematic structure of an example of a three phase brushless DC motor 31 with a rotor 32 having one permanent magnet. In this example, the stator consists of six electromagnets 33, 34, 35, 36, 37 and 38, each one having a stator winding or stator coil wound on a core. As it can be seen, the stator coils are labelled A, $\overline{A}$, B, $\overline{B}$, C, and $\overline{C}$, also named as phases A, $\overline{A}$, B, $\overline{B}$, C, and $\overline{C}$. Stator coils A and $\overline{A}$ are connected in series and wound on their cores such that when a current through the coils generates a magnetic north pole in phase A, that current will generate a south pole in phase $\overline{A}$, and vice versa. The same applies to phases B and $\overline{B}$ and phases C and $\overline{C}$, respectively. The free ends of coils $\overline{A}$, $\overline{B}$ and $\overline{C}$ are connected to a common point, also called a neutral point. In other words, the windings of the motor are connected in a star (Y) configuration. FIG. 5 also shows three Hall Effect sensors 39, 40 and 41 for detecting the rotor position, as it will be described below.

Figure 6:
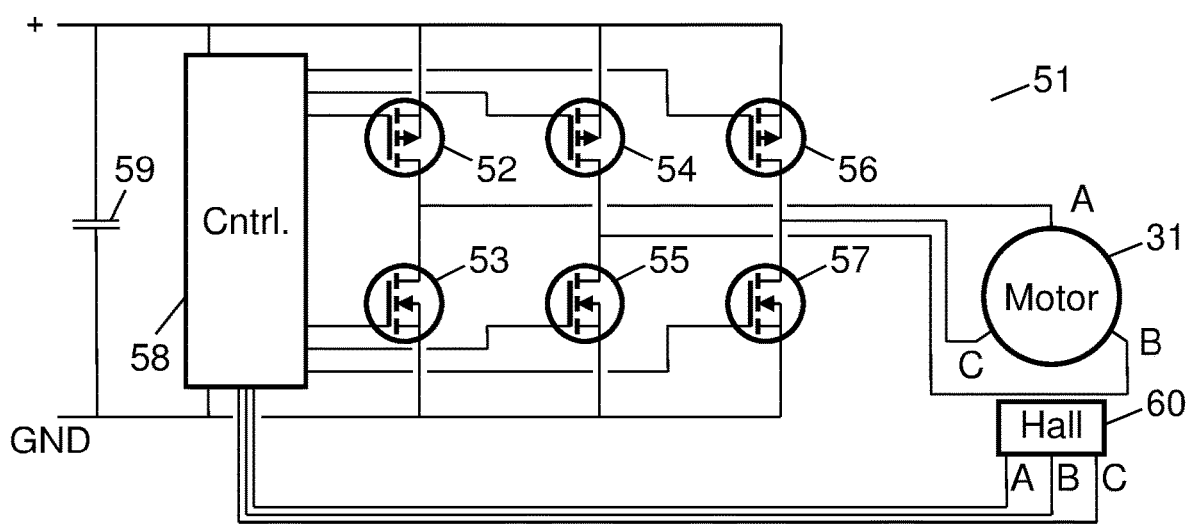
FIG. 6 shows a driver circuit and a control circuit for a brushless DC motor.

The free ends of coils A, B and C may be driven by a driver circuit 51 as illustrated in FIG. 6. The driver circuit 51 comprises six electronic switches 52, 53, 54, 55, 56 and 57, allowing each one of the coils to be connected to either a positive supply voltage or to a ground terminal (or negative supply voltage). The driver circuit 51 is also called a three-phase inverter, and it generates the DC currents in the motor phases. The switches 52, 53, 54, 55, 56 and 57 may be any type of electronically controlled switches, such as field effect transistors (FETs), insulated-gate bipolar transistors (IGBTs) or bipolar transistors, and they are switched on and off by a controller 58, as it will be described in further detail below. A capacitor 59 for smoothening the DC voltage is connected between the positive supply voltage and the ground terminal.

To be able to turn the switching transistors 52, 53, 54, 55, 56 and 57, and thus also the currents in the motor phases, on and off at the right times, the controller 58 needs information about the rotor's orientation and position relative to the stator coils. In this example, Hall Effect sensors are used. The Hall Effect sensor unit 60 comprises the three separate Hall Effect sensors 39, 40 and 41 arranged at the motor with an angle of 120° between them. The three Hall Effect sensors 39, 40 and 41 provide three overlapping signals giving a 60° wide position range. Based on the signals from these sensors, the controller 58 can determine the current position of the rotor 32 and thus also the proper time for switching the current from one stator coil to another. If the phase currents are not commutated between the stator coils at the right times, the efficiency of the motor will be reduced.

Figure 7:
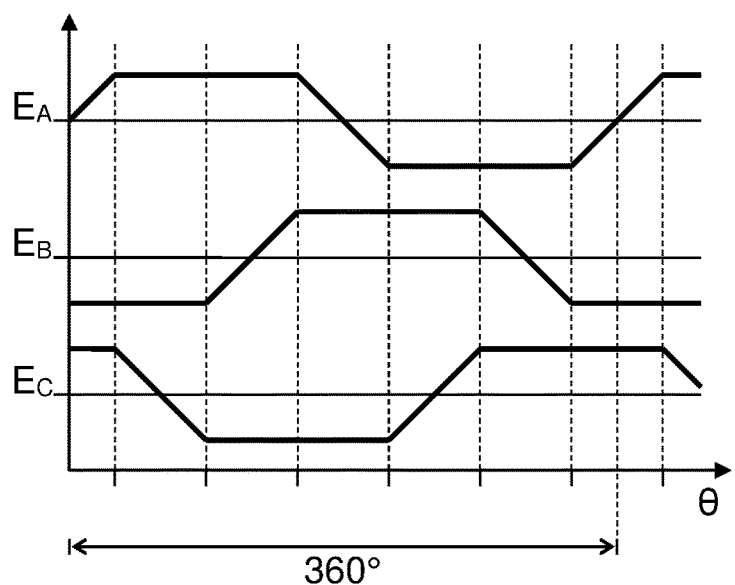
FIG. 7 shows an example of a trapezoidal back EMF for a three phase brushless DC motor.

FIG. 7 illustrates that the motor 31 in this example is designed to have a trapezoidal back EMF. The back EMF for each of the three stator phases A, B and C is shown separately for one full rotation on the rotor, corresponding to 360°.

Figure 8:
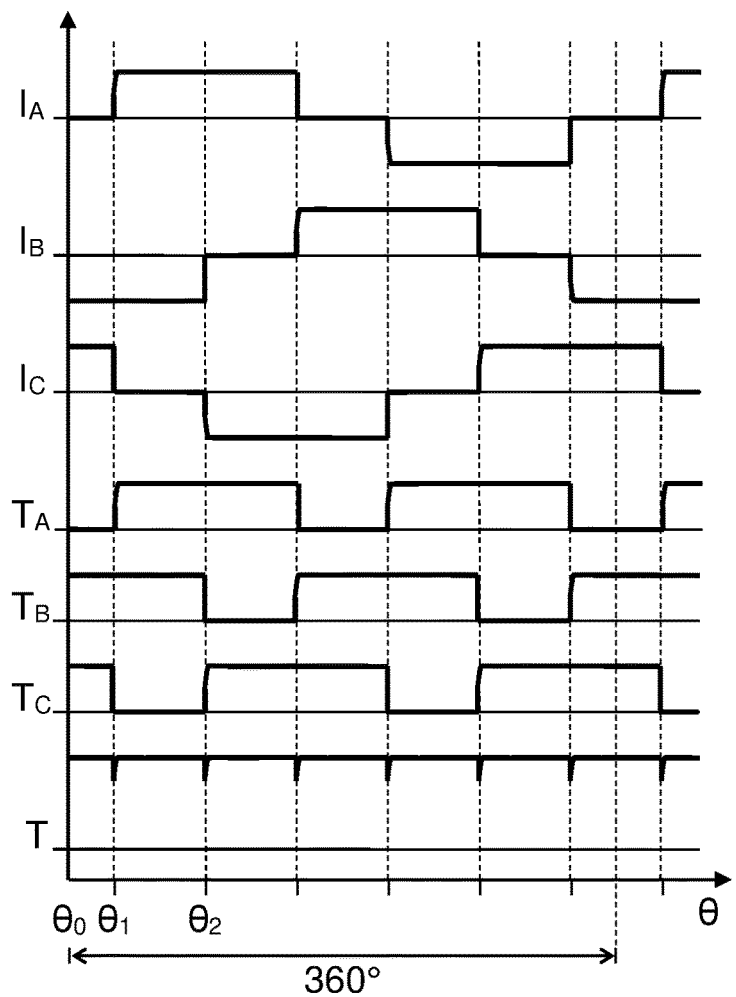
FIG. 8 shows how the motor current is switched between the three phases for a three phase brushless DC motor with a trapezoidal back EMF and the torque produced by the motor.

FIG. 8 illustrates how the motor current is switched between the three phases A, B and C by the switches 52, 53, 54, 55, 56 and 57 under control of the controller 58. The principle is that in intervals where the back EMF is at a high positive level for a phase, this phase is connected to the positive supply voltage by one of the switches 52, 54 or 56, resulting in a positive current in the corresponding stator coil. Correspondingly, a phase is connected to ground (or the negative supply voltage) by one of the switches 53, 55 or 57 in intervals where the back EMF is at a high negative level, resulting in a negative current in the stator coil. In this way, the applied voltage matches the back EMF. In intervals where the back EMF for a phase is changing direction, that phase is disconnected.

Figure 9:
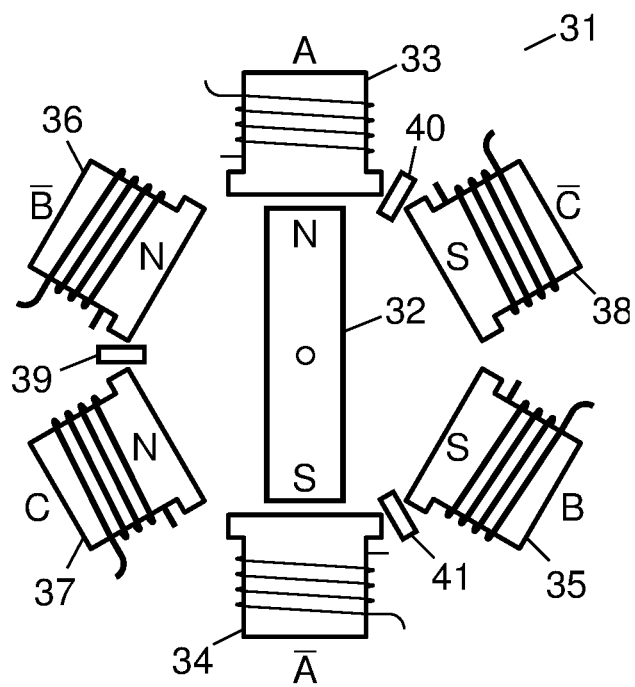
FIGS. 9 and 10 illustrate how the commutation of the motor current is controlled in the brushless DC motor of FIG. 5.

A situation corresponding to FIG. 5, where the rotor 32 is in line with the stator coils A and $\overline{A}$, i.e. where the angle position $\theta_0$ is 0°, is illustrated in FIG. 9. In order to get the rotor 32 to rotate in a clockwise direction, phase C is connected to the positive voltage through switch 56 to achieve a positive stator current in coils C and $\overline{C}$, while phase B is connected to ground through switch 55 to achieve a negative stator current in coils B and $\overline{B}$. These current values are also shown in FIG. 8. The result is that magnetic north poles are generated at the electromagnets $\overline{B}$ and C, and magnetic south poles are generated at the electromagnets $\overline{C}$ and B. The magnetic north pole of the rotor is thus attracted by the south pole of phase $\overline{C}$ and pushed away by the north pole of phase $\overline{B}$. Similarly, the magnetic south pole of the rotor is attracted by the north pole of phase C and pushed away by the south pole of phase B. Thus, a clockwise rotation of the rotor is obtained.

Figure 10:
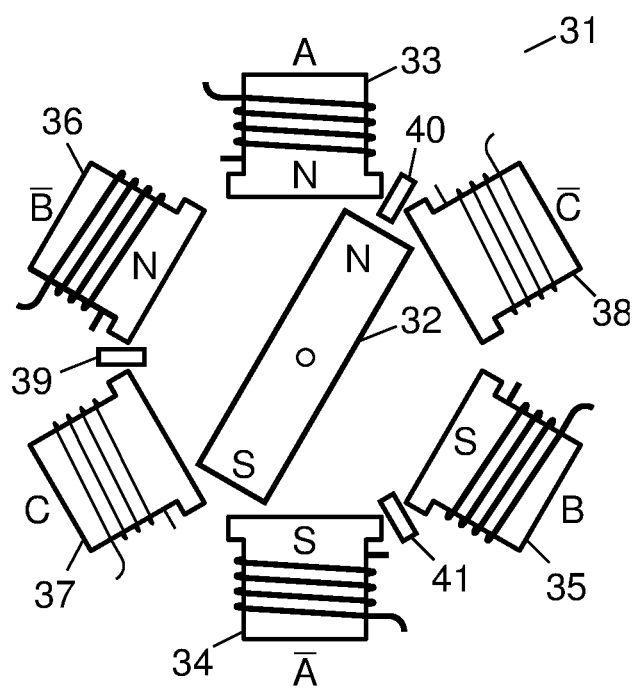

When the angle position of the rotor 32 reaches $\theta_1$ equal to 30°, i.e. the north pole of the rotor is midway between the electromagnets A and $\overline{C}$, this is detected by the Hall Effect sensors, and the positive current is switched (commutated) from phase C to phase A by turning switch 56 off and switch 52 on. This situation is shown in FIG. 10 and the commutation of the current is also illustrated in FIG. 8.

FIG. 8 shows how this commutation process continues during the clockwise rotation of the rotor. At $\theta_2$ (=90°), the negative current is commutated from phase B to phase C by turning switch 55 off and switch 57 on, and so on. At any time, each pole of the rotor 32 is attracted by an electromagnet ahead of it and pushed away by an electromagnet behind it. The Hall Effect sensors 39, 40 and 41 ensure that each commutation can be timed correctly by the controller 58. The principle is that at all times the phase pair that can produce the highest torque is energized. Thus, if the commutation does not take place at the correct time corresponding to the position of the rotor, a lower torque is produced, resulting in a reduced efficiency of the motor.

FIG. 8 also shows the produced torque $T_A$, $T_B$ and $T_C$ in each of the three phases A, B and C. The torque production in each phase is almost directly proportional to the phase current, except that the torque is positive for positive as well as negative phase currents. It can be seen that the total torque T produced by the motor, i.e. the sum of the torque produced in the three phases, is almost constant over time. In practice, however, the current cannot be established instantaneously in a motor phase, as it is also illustrated in FIG. 8. Consequently, a small torque ripple is present at each 60° phase commutation.

It is noted that in FIG. 8, the phase currents and the produced torque are shown as functions of the angle position $\theta$ for the rotor 32. However, when the motor is running at a constant speed, the x-axis could just as well show the time t, so that the same curves can be seen as illustrating the phase currents and the produced torque as functions of the time.

The back EMF of the motor is directly proportional to the motor speed, and since the back EMF matches the applied voltage, this means that the motor speed can be controlled by adjusting the applied DC voltage level. Thus, if the motor speed should be increased, a higher DC voltage is applied to the motor and the speed will increase correspondingly. The Hall Effect sensors ensure that the commutations are synchronized to the higher speed. Alternatively, pulse width modulation (PWM) can be used. In that case, a constant DC voltage is used and the motor speed is instead controlled by adjusting the duty cycle of the pulse width modulation.

Figure 11:
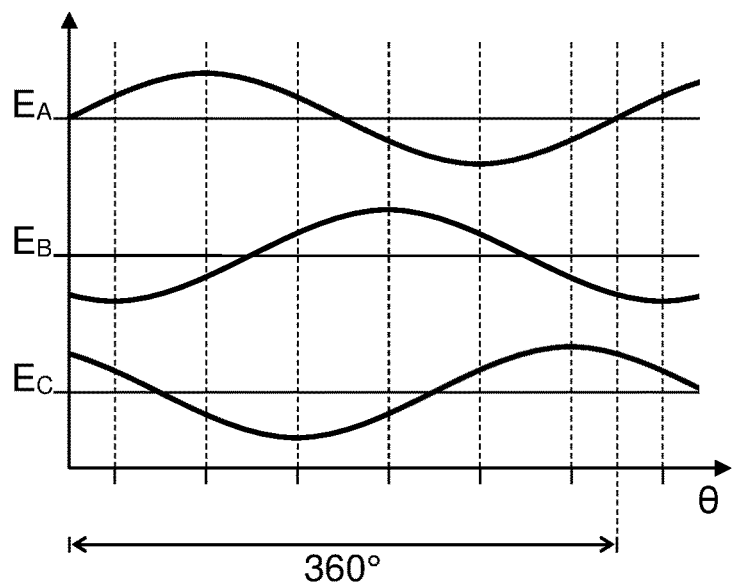
FIG. 11 shows an example of a sinusoidal back EMF for a three phase brushless DC motor.

As mentioned above, a brushless DC motor may also be designed to have a sinusoidal back EMF, and in that case, the highest efficiency is achieved by driving the motor with a sinusoidal drive voltage. FIG. 11 illustrates the back EMF for such a motor. The back EMF for each of the three stator phases A, B and C is shown separately for one full rotation on the rotor, corresponding to 360°.

Figure 12:
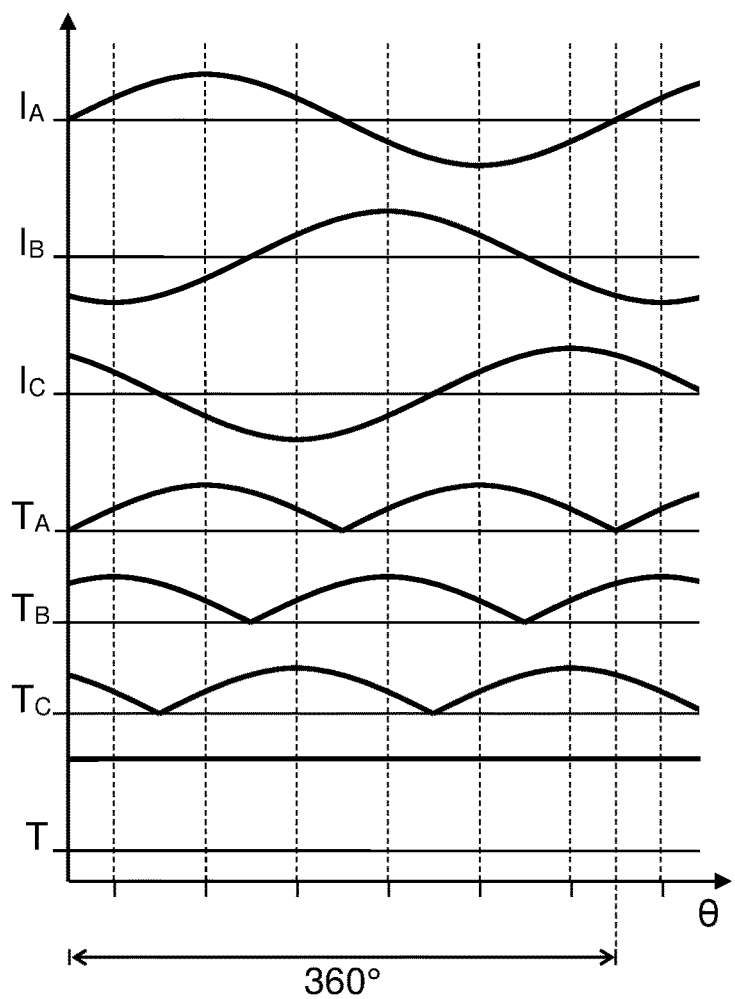
FIG. 12 shows how the motor current is switched between the three phases for a three phase brushless DC motor with a sinusoidal back EMF and the torque produced by the motor.

Similarly to FIG. 8, FIG. 12 illustrates the motor currents in the three phases A, B and C when a sinusoidal drive voltage is applied to the motor. This can still be done with six transistors 52, 53, 54, 55, 56 and 57 as shown in FIG. 6, but the transistors are now driven as amplifiers under control of the controller 58 instead of switches as it was the case above. Again, the applied voltage matches the back EMF, and the signals from the Hall Effect sensors 39, 40 and 41 enables the controller 58 to synchronize the sinusoidal drive voltages to the rotation of the rotor.

FIG. 12 also shows the produced torque $T_A$, $T_B$ and $T_C$ in each of the three phases A, B and C. The torque production in each phase is also here almost directly proportional to the phase current, except that the torque is positive for positive as well as negative phase currents. It can be seen that the total torque T produced by the motor, i.e. the sum of the torque produced in the three phases, is substantially constant over time. Thus, in this case no torque ripple is present.

In this case, the motor speed can be controlled by adjusting the amplitude of the applied sinusoidal voltages, or pulse width modulation can be used as above.

It is noted that the brushless DC motor described above and shown in FIG. 5 is of the conventional or so-called inrunner configuration, where the permanent magnet of the rotor is surrounded by the stator windings. Brushless DC motors also exist in a so-called outrunner or external-rotor configuration, where the radial relationship between coils and magnets is reversed, so that the stator coils form the center (core) of the motor, while the permanent magnets are arranged within an overhanging rotor that surrounds the core. In relation to the present invention, both configurations can be used.

As mentioned above, when the spindle of a linear actuator is not self-locking, a braking effect is needed to prevent the spindle and thus the load from accelerating to a speed higher than the intended speed, when the load is moved in a downwards direction.

Below, it is shown how a brushless DC motor can be controlled to provide the needed braking effect.

Figure 13:
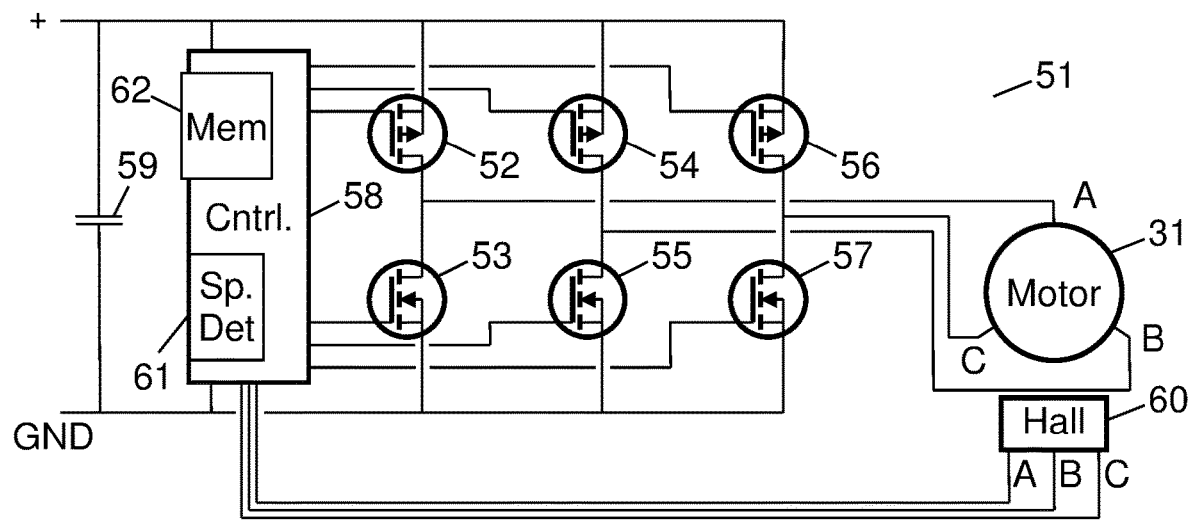
FIG. 13 shows a driver circuit and a control circuit with a speed detector for a brushless DC motor.

In an embodiment of the invention illustrated in FIG. 13, the controller 58 comprises a speed detector 61 that can detect when the brushless DC motor 31 accelerates to a speed higher than the intended speed. The actual speed of the motor can be detected in different ways. One possibility is to detect the actual motor speed from the three Hall Effect sensors 39, 40 and 41. Based on the signals from these sensors, the speed detector 61 can determine the current speed of the rotor 32 and compare the result to a reference value representing the expected or intended speed. If the intended speed is exceeded, the speed detector 61 provides a signal to the controller 58 causing it to provide a braking effect to the motor, as it will be described below.

Instead of using the Hall Effect sensors 39, 40 and 41, the speed detector 61 can also detect the actual speed of the motor by measuring the frequency of the back EMF generated by the motor. Again, the result can be compared to a reference value representing the expected or intended speed. If the intended speed is exceeded, the speed detector 61 provides a signal to the controller 58 causing it to provide a braking effect to the motor.

Another possibility of detecting that the brushless DC motor 31 accelerates to a speed higher than the intended speed is to measure the motor current, which can be done by inserting a small resistor in the supply line to the six switching transistors 52, 53, 54, 55, 56 and 57 and measuring the voltage drop across the resistor. As mentioned earlier, the motor current is proportional to the torque required by the motor, and when the load of a linear actuator is accelerating in a downwards direction, very little or no torque is required by the motor, which means that the motor current will drop to a very low value. Thus, if the motor current drops to below a predetermined limit, it is an indication that the brushless DC motor 31 is accelerating to a speed higher than the intended speed, and the speed detector 61 can provide a signal to the controller 58 causing it to provide a braking effect to the motor.

A further possibility of detecting that the brushless DC motor 31 accelerates to a speed higher than the intended speed is to measure the supply voltage to the six switching transistors 52, 53, 54, 55, 56 and 57. When the load of a linear actuator is accelerating in a downwards direction, the motor is caused to at least partly function as a generator, which means that the supply voltage will increase because the generated voltage is added to the existing supply voltage. Thus, if an increase is detected in the supply voltage, it is an indication that the brushless DC motor 31 is accelerating to a speed higher than the intended speed, and the speed detector 61 can provide a signal to the controller 58 causing it to provide a braking effect to the motor.

When the controller 58 receives a signal from the speed detector 61 indicating that the brushless DC motor 31 is accelerating to a speed higher than the intended speed, it is configured to modify the control signals to the transistors 52, 53, 54, 55, 56 and 57, so that also the phase voltages and phase currents applied to the motor are modified to achieve a braking effect.

As mentioned above, the efficiency of a brushless DC motor is highest when the drive voltage matches the back EMF voltage from the motor. With a motor having a trapezoidal back EMF, the best efficiency is obtained by using a corresponding trapezoidal drive voltage, and correspondingly, the best efficiency for a motor having a sinusoidal back EMF is obtained by using a sinusoidal drive voltage. As also mentioned, the efficiency of the motor is reduced, if the commutation of the phase currents between the stator coils is not made at the correct times as defined by the Hall Effect sensors 39, 40 and 41. This means that the efficiency of the motor can be intentionally reduced by modifying the applied waveform and/or changing the commutation times. In this way, energy is dissipated by the motor, with the result that a braking effect is achieved.

For a brushless DC motor having a sinusoidal back EMF, one way of intentionally reducing the efficiency of the motor is to use a trapezoidal drive voltage, i.e. to drive the motor according to FIG. 8 instead of FIG. 12. This will result in a produced torque value that is reduced compared to FIG. 12, and which is not constant but made up of portions of a sine wave. The reduced torque production gives a reduced efficiency, and thus a braking effect is achieved.

Figure 14:
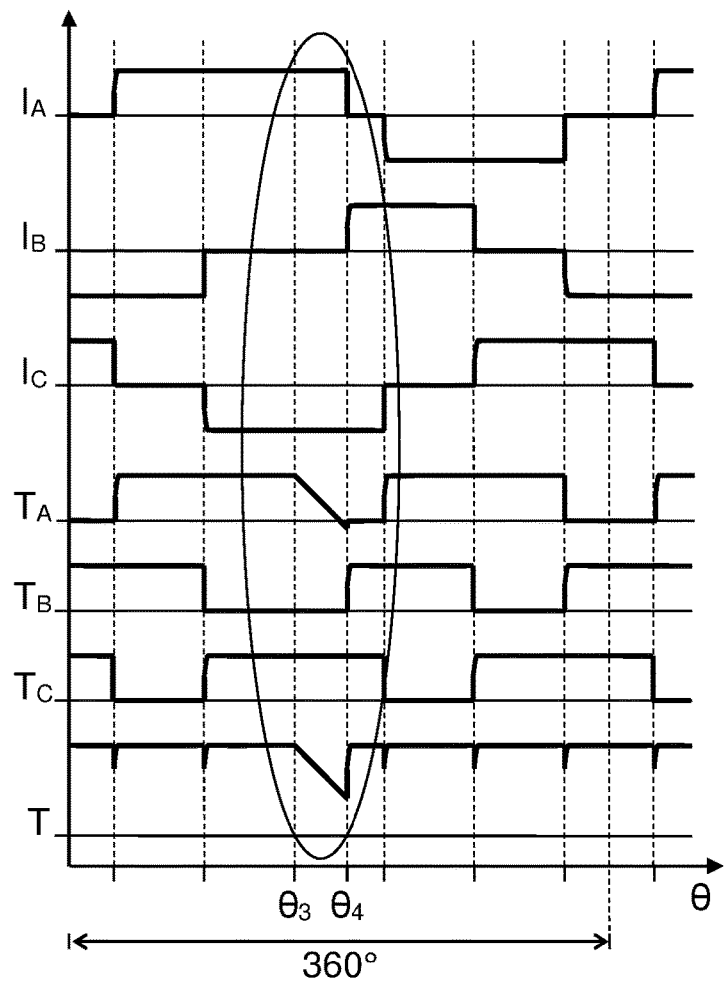
FIG. 14 illustrates how a commutation from one phase to another in a brushless DC motor can be made at an angle position that is different from the angle position suggested by Hall Effect sensors to reduce the efficiency of the motor.

Another example of reducing the efficiency of the motor is illustrated in FIG. 14 for a brushless DC motor having a trapezoidal back EMF. Here, the efficiency is reduced by making a commutation from one phase to another at an angle position or time that is different from the angle position or time suggested by the Hall Effect sensors 39, 40 and 41. Under normal conditions, i.e. when no braking is needed, the positive current should have been commutated from phase A to phase C at angle position $\theta_3$ of the rotor, as it was illustrated in FIG. 8. However, when the controller 58 receives a signal from the speed detector 61 indicating that the brushless DC motor 31 is accelerating to a speed higher than the intended speed, the controller 58 can postpone the commutation to angle position $\theta_4$ of the rotor as shown in FIG. 14, i.e. to a later time. Thus in the interval from angle position $\theta_3$ to angle position $\theta_4$ there will be no torque production in phase B, since there is no current, and in phase A the torque will be gradually reduced as the rotor approaches the position where it is in line with the coils of phase A. When this position is passed, i.e. shortly before $\theta_4$, the torque will even become negative because the electromagnets of phase A will now try to pull the rotor back to this position. As a result, the total torque is reduced as shown in FIG. 14. Again, the reduced torque production results in a braking effect.

Depending on the braking effect achieved, which is detected by the speed detector 61, the postponement of the commutation may have to be repeated several times and/or the amount of postponement may have to be adjusted according to the achieved effect. As an alternative to postponing the commutation as shown in FIG. 14, it could also be advanced to take place before the angle position or time that is suggested by the Hall Effect sensors 39, 40 and 41.

This solution of reducing the efficiency of the motor can also be used for a brushless DC motor having a sinusoidal back EMF. In that case, the sinusoidal waveforms will be distorted in dependence of the amount of delay or advancement applied.

Figure 15:
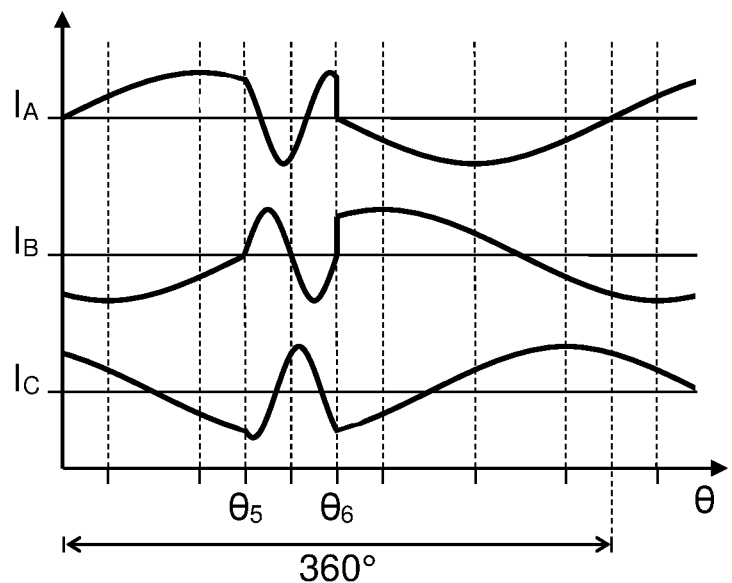
FIG. 15 illustrates how the applied waveform to a brushless DC motor can be modified by changing the frequency of the applied three-phase voltage to a higher frequency for a short time to reduce the efficiency of the motor.

FIG. 15 shows a further example of how the efficiency of a brushless DC motor can be intentionally reduced for obtaining a braking effect in the situation where a brushless DC motor is accelerating to a speed higher than the intended speed. This example is illustrated for a brushless DC motor having a sinusoidal back EMF, but the same solution can just as well be used for a brushless DC motor having a trapezoidal back EMF. When the controller 58 receives a signal from the speed detector 61 indicating that the brushless DC motor 31 is accelerating to a speed higher than the intended speed, the controller 58 is configured to modify the applied waveform by changing the frequency of the applied three-phase voltage to a higher frequency for a short time. This means that during this time the magnetic field created by the stator coils of the brushless DC motor will rotate much faster than the rotor is able to follow, and in a considerable part of this time, the produced torque in at least one of the phases will be negative. This is illustrated in FIG. 15. When the current in a phase has the opposite direction of what is expected according to the position of the rotor, negative torque is produced in that phase. In this way, a braking effect is achieved.

In FIG. 15, the higher frequency is maintained for one period of that frequency, i.e. in the interval from angle position $\theta_5$ to angle position $\theta_6$ of the rotor, before the controller returns to using the normal frequency corresponding to the intended rotational speed. However, the higher frequency can be maintained for a shorter or longer time in dependence of the amount of braking needed in the situation. Also the frequency may be varied. In FIG. 15, the higher frequency is shown to be about a factor six higher than the normal frequency corresponding to the intended rotational speed, but in a practical implementation, this factor will typically be higher. The closer the two frequencies are to each other, the higher the achieved braking effect will be. As an example, the controller 58 can start using a frequency 20 times higher than the normal frequency when the signal from the speed detector 61 indicates that the brushless DC motor 31 is accelerating to a speed higher than the intended speed. If the signal from the speed detector 61 then indicates that more braking is needed, the controller can continue with a frequency 10 times higher than the normal frequency. If this is still not enough, the controller can then use a frequency five times higher than the normal frequency.

Instead of modifying the applied waveform by changing the frequency of the applied three-phase voltage to a higher frequency for a short time, the controller 58 can, in an alternative embodiment, be configured to modify the applied waveform by changing the frequency of the applied three-phase voltage to a lower frequency for a short time. Also in this case, the rotating magnetic field created by the stator coils of the brushless DC motor will be out of synchronism with the rotor with the result that a braking effect is achieved.

Figure 16:
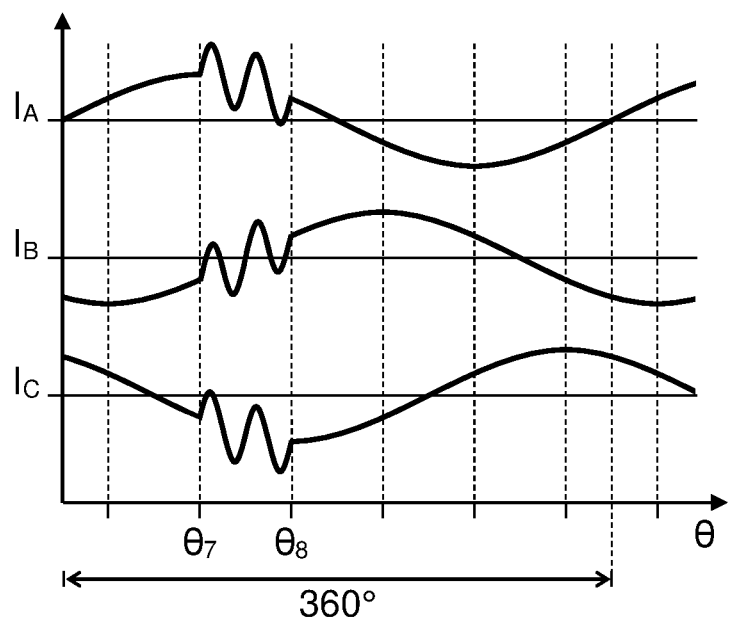
FIG. 16 illustrates how the applied waveform to a brushless DC motor can be modified by superimposing a signal of higher frequency on the normally applied three-phase voltage for a time in dependence of the braking effect needed to reduce the efficiency of the motor.

Still another example of how the efficiency of a brushless DC motor can be intentionally reduced for obtaining a braking effect is illustrated in FIG. 16. This example is illustrated for a brushless DC motor having a sinusoidal back EMF. When the controller 58 receives a signal from the speed detector 61 indicating that the brushless DC motor 31 is accelerating to a speed higher than the intended speed, the controller 58 is configured to modify the applied waveform by superimposing a signal of higher frequency on the normally applied three-phase voltage for a time in dependence of the braking effect needed. In FIG. 16, this higher frequency signal is superimposed in the interval from angle position $\theta_7$ to angle position $\theta_8$ of the rotor. The superimposed signal can be considered as a noise signal or modulated signal. The effect of the superimposed signal is again that the torque production of the motor is reduced so that a braking effect is achieved.

The duration of the superimposed frequency can be selected in dependence of the required braking effect. If the signal from the speed detector 61 indicates that the achieved braking effect is not sufficient, the duration can be extended, or the amplitude of the superimposed signal can be increased.

In an alternative embodiment of this solution, the signal of higher frequency is permanently superimposed, and instead its amplitude is varied in dependence of the required braking effect. When no braking effect is needed, i.e. under normal conditions, the amplitude is set to zero or near zero, and when the signal from the speed detector 61 indicates that a braking effect is needed, the amplitude can be increased to a preselected value. If the signal from the speed detector 61 then indicates that the achieved braking effect is not sufficient, the amplitude can be increased. Should the speed detector 61 indicate that the achieved braking effect is too high, the amplitude can instead be decreased to a lower value.

Figure 17:
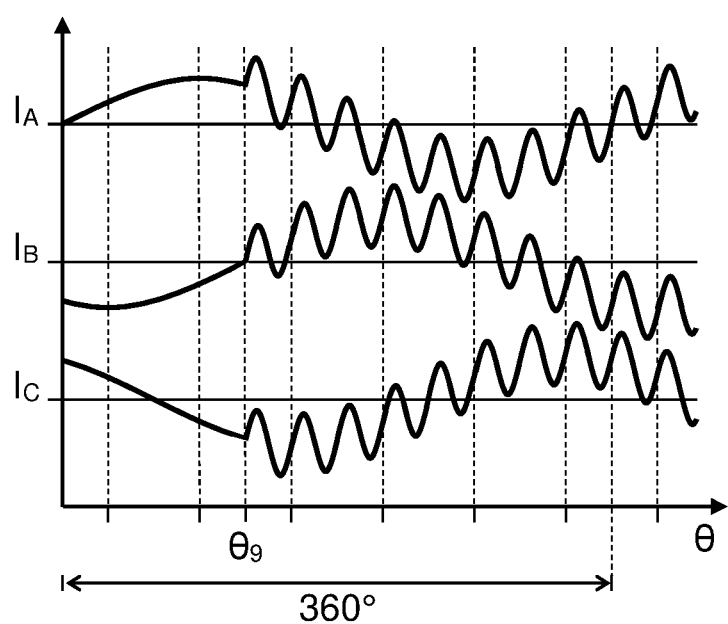
FIG. 17 illustrates how the applied waveform to a brushless DC motor can be modified by superimposing a signal of higher frequency on the normally applied three-phase voltage with an amplitude determined in dependence of the braking effect needed to reduce the efficiency of the motor.

Such a situation is illustrated in FIG. 17. Before angle position $\theta_9$ of the rotor, the figure illustrates a situation where no braking effect is needed, and the amplitude of the superimposed frequency signal is therefore set to zero. However, at angle position $\theta_9$ of the rotor, the speed detector 61 indicates that a braking effect is needed, and the amplitude is increased to a preselected value. It is also possible to detect the difference between the actual speed of the rotor and the intended speed and then select the amplitude of the superimposed signal in dependence of this difference. In this way, the braking effect can be automatically adjusted to the need.

Any one of the above mentioned embodiments for intentionally reducing the efficiency of a brushless DC motor for obtaining a braking effect can be implemented by modifying a control program in the controller 58. As illustrated in FIG. 13, the controller 58 may comprise a memory 62 configured to store a control program or computer program in a format readable by the controller 58. The memory 62 may be removable so that a shift from one of the above embodiments to another can be made by replacing the memory 62 considered as a computer readable medium by another one according to the desired embodiment.

Should a situation occur, in which the power to the system is unintentionally interrupted, the embodiments described above will still, at least to a certain degree, be able to prevent the load on the linear actuator from accelerating out of control in the downwards direction. When the power is disconnected, the controller 58 and the driver circuit 51 will continue to work as long as the capacitor 59 can supply a sufficient voltage. When this is no longer the case, the motor will be left without any applied voltage, and in case of a heavy load, an uncontrolled downwards acceleration will start. However, when this occurs, the motor will start working as a generator, and the generated voltage will charge the capacitor 59. As soon as the capacitor 59 is charged to a sufficient voltage level, it can again supply voltage to the controller 58 and the driver circuit 51, and they will start working again and regain control of the motor by providing a braking effect as described above. Of course, the capacitor 59 then again be discharged, but then the procedure will repeat itself until the load reaches its lower position with a speed that may be considerably reduced, compared to a situation where no braking effect was present.

Figure 18:
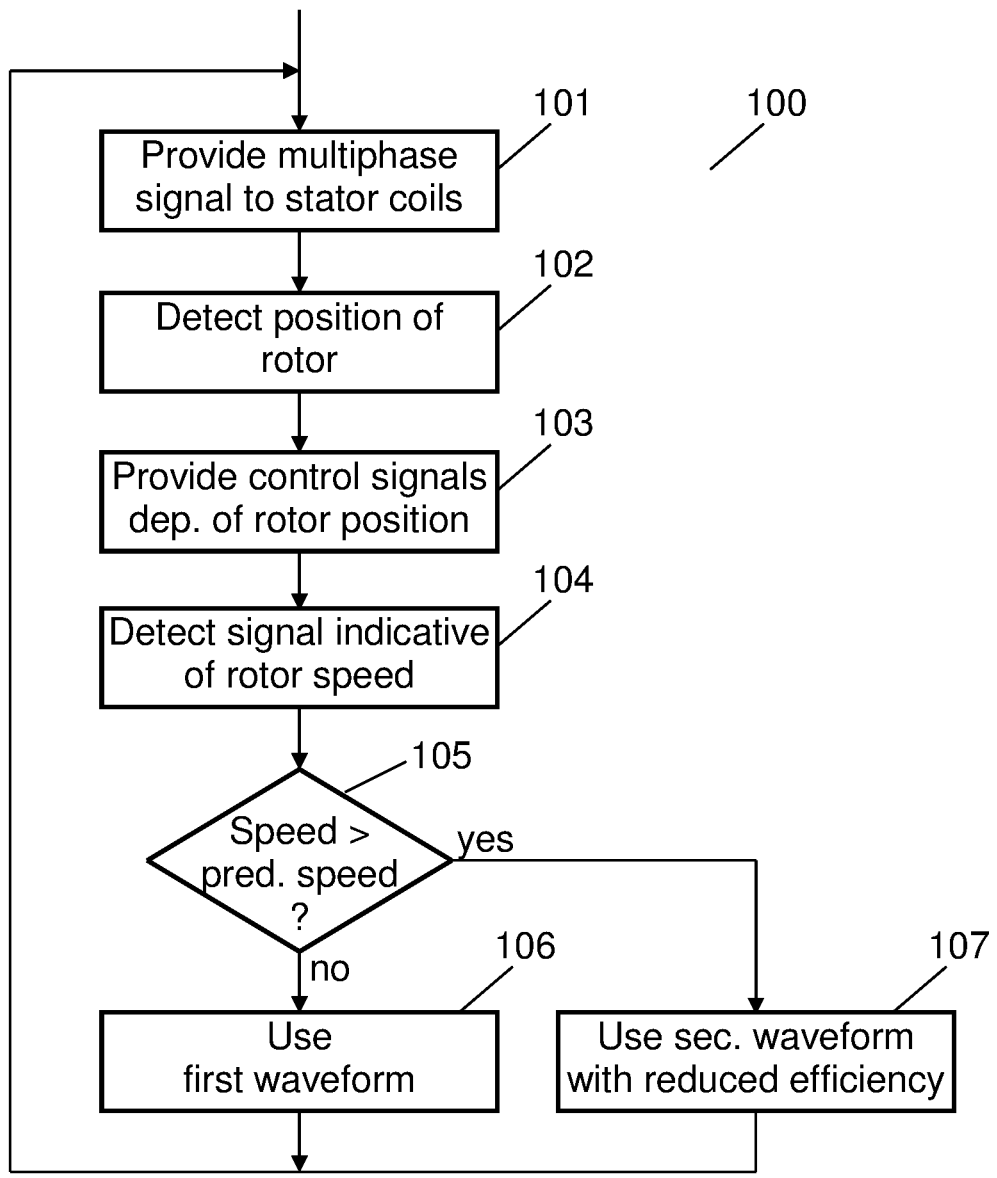
FIG. 18 shows a flow chart illustrating a method of controlling a linear actuator with a brushless DC motor to reduce the efficiency of the motor.

FIG. 18 shows a flow chart 100 illustrating a method of controlling a linear actuator using a brushless DC motor 31 with driver circuit 51 and controller 58 to provide a braking effect as described above. In step 101, a multiphase voltage signal is provided from the driver circuit 51 to the stator coils of the brushless DC motor 31 to cause its rotor 32 to rotate. In step 102, the current position of the rotor 32 is detected, e.g. by means of the Hall Effect sensors 39, 40 and 41, and in dependence of this position control signals are provided from the controller 58 to the driver circuit 51 in step 103 to ensure synchronism between the rotating magnetic field and the rotor. In step 104, a signal that indicates the current speed of the rotor is detected in the speed detector 61. As described above, this signal can e.g. be derived from the Hall Effect sensors 39, 40 and 41, the motor current or the supply voltage. This signal is then compared in step 105 to a signal representing an intended or predetermined speed. If the signal indicates that the intended speed is not exceeded, the driver circuit is controlled in step 106 to drive the motor with a waveform of the multiphase voltage signal that ensures the normal and expected efficiency of the motor. If, on the other hand, the signal indicates that the intended speed is exceeded, the driver circuit is instead controlled in step 107 to drive the motor with a waveform of the multiphase voltage signal that is modified as described above to ensure a lower efficiency of the motor with the result that the desired braking effect is achieved.

In other words, there is disclosed a linear actuator comprising a brushless DC motor comprising a number of stator coils and a permanent magnet rotor; a driver circuit configured to provide a multiphase voltage signal to the stator coils of said brushless DC motor; and a controller for detecting a position of said permanent magnet rotor and providing control signals to said driver circuit in dependence of said rotor position. The linear actuator further comprises detector circuitry for detecting a signal indicative of a rotation speed of said permanent magnet rotor, and that the controller is further configured to control the driver circuit to drive the stator coils of the motor with a first waveform of said multiphase voltage signal, when said indicative signal indicates that the rotation speed of said permanent magnet rotor does not exceed a predetermined speed; and control the driver circuit to drive the stator coils of the motor with a second waveform of said multiphase voltage signal, when said indicative signal indicates that the rotation speed of said permanent magnet rotor exceeds said predetermined speed, wherein said second waveform is selected to drive the motor with an efficiency that is less than the efficiency of the motor when driven by said first waveform.

When a brushless DC motor is driven with a first waveform, when no braking effect is needed, and driven with another waveform resulting in a lower efficiency of the motor, when an increased speed is detected, energy is dissipated in the motor with the result that the desired braking effect can be achieved.

In some embodiments, said brushless DC motor is of a type having a trapezoidal back electromotive force, and the controller and the driver circuit are configured to provide said first waveform of said multiphase voltage signal by commutating phase currents between stator coils at times determined in dependence of said rotor position, so that the multiphase voltage signal has a frequency corresponding to the rotation speed of said permanent magnet rotor.

In other embodiments, said brushless DC motor is of a type having a sinusoidal back electromotive force, and the controller and the driver circuit are configured to provide said first waveform of said multiphase voltage signal in dependence of said rotor position as a multiphase sinusoidal voltage signal having a frequency corresponding to the rotation speed of said permanent magnet rotor.

In an embodiment of the linear actuator, the controller and the driver circuit are further configured to provide said second waveform by commutating at least one phase current at a time that is different from the time determined in dependence of said rotor position. When a commutation from one phase to another is delayed or advanced in time or angle position, the torque delivered by the motor, and thus also its efficiency, is reduced with the result that a braking effect is achieved.

In another embodiment of the linear actuator, the controller and the driver circuit are further configured to provide said second waveform by changing for a predetermined period of time the frequency of the multiphase voltage signal to a frequency that is different from the frequency corresponding to the rotation speed of said permanent magnet rotor. When the frequency of the multiphase voltage signal is changed, the rotating magnetic field created by the stator coils of the brushless DC motor will be out of synchronism with the rotation of the rotor. This reduces the torque production and the efficiency of the motor, and a braking effect is achieved.

In a further embodiment of the linear actuator, the controller and the driver circuit are further configured to provide said second waveform by superimposing on the multiphase voltage signal a signal having a frequency higher than the frequency corresponding to the rotation speed of said permanent magnet rotor.

In this embodiment, the controller and the driver circuit may further be configured to superimpose said higher frequency signal for a predetermined period of time or for a period of time determined in dependence of said signal indicative of the rotation speed of said permanent magnet rotor. Alternatively, the controller and the driver circuit may further be configured to superimpose said higher frequency signal with an amplitude determined in dependence of said signal indicative of the rotation speed of said permanent magnet rotor.

An actuator system may comprise at least one linear actuator as described above. In this way, the actuator system benefits from the described advantages of the linear actuator.

In a method of controlling a linear actuator, where the linear actuator comprises a brushless DC motor comprising a number of stator coils and a permanent magnet rotor; a driver circuit; and a controller, the method comprises the steps of providing a multiphase voltage signal from the driver circuit to the stator coils of said brushless DC motor; detecting a position of said permanent magnet rotor and providing control signals to said driver circuit in dependence of said rotor position; detecting a signal indicative of a rotation speed of said permanent magnet rotor, controlling the driver circuit to drive the stator coils of the motor with a first waveform of said multiphase voltage signal, when said indicative signal indicates that the rotation speed of said permanent magnet rotor does not exceed a predetermined speed; and controlling the driver circuit to drive the stator coils of the motor with a second waveform of said multiphase voltage signal, when said indicative signal indicates that the rotation speed of said permanent magnet rotor exceeds said predetermined speed, wherein said second waveform is selected to drive the motor with an efficiency that is less than the efficiency of the motor when driven by said first waveform.

When a brushless DC motor is driven with a first waveform, when no braking effect is needed, and driven with another waveform resulting in a lower efficiency of the motor, when an increased speed is detected, energy is dissipated in the motor with the result that the desired braking effect can be achieved.

Also disclosed is a computer program comprising program code means for performing the steps of the method described above when said computer program is run on a computer, and a computer readable medium having stored thereon program code means for performing the method described above when said program code means is run on a computer.

Although various embodiments of the present invention have been described and shown, the invention is not restricted thereto, but may also be embodied in other ways within the scope of the subject-matter defined in the following claims.

The invention claimed is:

1. A linear actuator comprising:
    a brushless DC motor comprising a number of stator coils and a permanent magnet rotor;
    a driver circuit configured to provide a multiphase voltage signal to the stator coils of said brushless DC motor;
    a controller for detecting a position of said permanent magnet rotor and providing control signals to said driver circuit in dependence of said rotor position,
    detector circuitry for detecting an indicative signal indicative of a rotation speed of said permanent magnet rotor,
    wherein the controller is further configured to
        control the driver circuit to drive the stator coils of the motor with a first waveform of said multiphase voltage signal, when said indicative signal indicates that the rotation speed of said permanent magnet rotor does not exceed a predetermined speed; and
        control the driver circuit to drive the stator coils of the motor with a second waveform of said multiphase voltage signal, when said indicative signal indicates that the rotation speed of said permanent magnet rotor exceeds said predetermined speed,
        wherein said second waveform comprises one of (i) a modified first waveform and (ii) said first waveform commutated at times different from times determined in dependence of said rotor position, wherein said second waveform is configured to drive the motor with an efficiency that is less than the efficiency of the motor when driven by said first waveform;
    wherein said brushless DC motor is one of
        (i) a type having a trapezoidal back electromotive force, and wherein the controller and the driver circuit are configured to provide said first waveform of said multiphase voltage signal by commutating phase currents between stator coils at times determined in dependence of said rotor position, so that the multiphase voltage signal has a frequency corresponding to the rotation speed of said permanent magnet rotor; or
        (ii) a type having a sinusoidal back electromotive force, and wherein the controller and the driver circuit are configured to provide said first waveform of said multiphase voltage signal in dependence of said rotor position as a multiphase sinusoidal voltage signal having a frequency corresponding to the rotation speed of said permanent magnet rotor.

2. A linear actuator according to claim 1, wherein said brushless DC motor is of the type having the trapezoidal back electromotive force, and wherein the controller and the driver circuit are further configured to provide said second waveform by commutating at least one phase current at a time that is different from the time determined in dependence of said rotor position.

3. A linear actuator according to claim 1, wherein the controller and the driver circuit are further configured to provide said second waveform by changing for a predetermined period of time the frequency of the multiphase voltage signal to a frequency that is different from the frequency corresponding to the rotation speed of said permanent magnet rotor.

4. A linear actuator according to claim 1, wherein said brushless DC motor is of the type having the sinusoidal back electromotive force, and wherein the controller and the driver circuit are further configured to provide said second waveform by superimposing on the multiphase voltage signal a signal having a frequency higher than the frequency corresponding to the rotation speed of said permanent magnet rotor.

5. A linear actuator according to claim 4, wherein the controller and the driver circuit are further configured to superimpose said higher frequency signal for a predetermined period of time.

6. A linear actuator according to claim 4, wherein the controller and the driver circuit are further configured to superimpose said higher frequency signal for a period of time determined in dependence of said signal indicative of the rotation speed of said permanent magnet rotor.

7. A linear actuator according to claim 4, wherein the controller and the driver circuit are further configured to superimpose said higher frequency signal with an amplitude determined in dependence of said signal indicative of the rotation speed of said permanent magnet rotor.

8. An actuator system comprising at least one linear actuator according to claim 1.

9. A method of controlling a linear actuator, the linear actuator comprising:
    a brushless DC motor comprising a number of stator coils and a permanent magnet rotor;
    a driver circuit;
    a controller, wherein the method comprising the steps of:
        providing a multiphase voltage signal from the driver circuit to the stator coils of said brushless DC motor;
        detecting a position of said permanent magnet rotor and providing control signals to said driver circuit in dependence of said rotor position;
        detecting an indicative signal indicative of a rotation speed of said permanent magnet rotor,
        controlling the driver circuit to drive the stator coils of the motor with a first waveform of said multiphase voltage signal, when said indicative signal indicates that the rotation speed of said permanent magnet rotor does not exceed a predetermined speed; and
        controlling the driver circuit to drive the stator coils of the motor with a second waveform of said multiphase voltage signal, when said indicative signal indicates that the rotation speed of said permanent magnet rotor exceeds said predetermined speed, wherein said second waveform comprises one of (i) a modified first waveform and (ii) said first waveform commutated at times different from times determined in dependence of said rotor position, wherein said second waveform is configured to drive the motor with an efficiency that is less than the efficiency of the motor when driven by said first waveform, wherein said brushless DC motor is one of
            (i) a type having a trapezoidal back electromotive force, and wherein the controller and the driver circuit are configured to provide said first waveform of said multiphase voltage signal by commutating phase currents between stator coils at times determined in dependence of said rotor position, so that the multiphase voltage signal has a frequency corresponding to the rotation speed of said permanent magnet rotor; or
            (ii) a type having a sinusoidal back electromotive force, and wherein the controller and the driver circuit are configured to provide said first waveform of said multiphase voltage signal in dependence of said rotor position as a multiphase sinusoidal voltage signal having a frequency corresponding to the rotation speed of said permanent magnet rotor.

10. A computer program comprising program code means for performing the steps of claim 9 when said computer program is run on a computer.

11. A computer readable medium having stored thereon program code means for performing the method of claim 9 when said program code means is run on a computer.

* * * * *